United States Patent
McGary

(10) Patent No.: US 7,564,838 B2
(45) Date of Patent: Jul. 21, 2009

(54) EMERGENCY CALL METHODOLOGY FOR VOIP COMMUNICATIONS

(76) Inventor: Faith McGary, 1324 Madison Ave., Bethlehem, PA (US) 18018

( * ) Notice: Subject to any disclaimer, the term of this patent is extended or adjusted under 35 U.S.C. 154(b) by 233 days.

(21) Appl. No.: 11/526,094

(22) Filed: Sep. 22, 2006

(65) Prior Publication Data

US 2007/0121598 A1   May 31, 2007

Related U.S. Application Data

(60) Provisional application No. 60/719,742, filed on Sep. 22, 2005, provisional application No. 60/757,113, filed on Jan. 5, 2006.

(51) Int. Cl.
*H04L 12/66* (2006.01)
(52) U.S. Cl. .................. 370/352; 370/401; 379/45
(58) Field of Classification Search ............ None
See application file for complete search history.

(56) References Cited

U.S. PATENT DOCUMENTS

| | | | |
|---|---|---|---|
| 7,260,186 B2* | 8/2007 | Zhu et al. ............... | 379/45 |
| 7,376,734 B2* | 5/2008 | Caveney ................. | 709/224 |
| 7,388,490 B2* | 6/2008 | Freitag et al. .......... | 340/572.1 |
| 2005/0007999 A1* | 1/2005 | Becker et al. ........... | 370/352 |
| 2005/0169248 A1* | 8/2005 | Truesdale et al. ....... | 370/352 |
| 2005/0181805 A1* | 8/2005 | Gallagher ............... | 455/456.1 |
| 2005/0213716 A1* | 9/2005 | Zhu et al. ............... | 379/45 |
| 2005/0243973 A1* | 11/2005 | Laliberte ................ | 379/37 |
| 2005/0265326 A1* | 12/2005 | Laliberte ................ | 370/389 |
| 2006/0056388 A1* | 3/2006 | Livingood .............. | 370/352 |
| 2006/0159235 A1* | 7/2006 | Eisner et al. ............ | 379/45 |
| 2006/0281437 A1* | 12/2006 | Cook ..................... | 455/404.2 |
| 2006/0286984 A1* | 12/2006 | Bonner ................... | 455/445 |
| 2006/0293024 A1* | 12/2006 | Benco et al. ............ | 455/404.2 |
| 2007/0013516 A1* | 1/2007 | Freitag et al. .......... | 340/572.1 |

* cited by examiner

*Primary Examiner*—Bob A Phunkulh
(74) *Attorney, Agent, or Firm*—Sofer & Haroun, LLP

(57) ABSTRACT

A method for determining the location of a VoIP caller includes receiving an emergency call from a VoIP phone from the internet via a VoIP enabling device. A device identifier of the VoIP enabling device through which the call from the VoIP device originated is received. The device identifier is compared against a pre-defined table of device identifiers, where each device identifier in the table has an associated physical location. The physical location of the VoIP enabling device is returned during the call from the VoIP phone.

3 Claims, 12 Drawing Sheets

| MAC field 326 | Location field 328 |
|---|---|
| xyz123abc | Lat – X Lon- X<br>123 abc lane, ZIP |
| 123456789 | Lat – X Lon – X<br>567 smith lane, ZIP |
| ab12cd34 | Lat – X Lon – X<br>234 John street, ZIP |
| zyxcba567 | Lat – X Lon- X<br>427 xyz road, ZIP |
| 987654abc | Lat- X Lon – X<br>22 bar road, ZIP |
| 83268bca | Lat – X Lon – X<br>454 dog street, ZIP |
| 12348947 | Lat – X Lon – X<br>55 street road, ZIP |

MAC address table 322

Figure 6

EMERGENCY CALL METHODOLOGY FOR VOIP COMMUNICATIONS

RELATED APPLICATIONS

This application is related to and claims the benefit of priority from U.S. Provisional Patent Application No. 60/719,742, filed on Sep. 22, 2005, and U.S. Provisional Patent Application No. 60/757,113 filed on Jan. 5, 2006, the entirety of which are incorporated herein by reference.

FIELD OF THE INVENTION

The present invention relates to the field of emergency services communications. More particularly, the present invention relates to the field of emergency services communications in connection with VoIP (Voice Over Internet Protocol).

BACKGROUND

Currently, the rise in use of VoIP (Voice Over Internet Protocol) telephones has outpaced the ability of emergency telephone systems, such as 9-1-1, to handle these types of calls. First, because VoIP telephone calls do not originate from fixed physical locations in the same manner as landline telephone calls, it is difficult to ensure that the emergency call is sent to the appropriate local PSAP (Public Safety Access Point) responding to the location of the 9-1-1 call, such as the local police, local fire or local 9-1-1 emergency call center.

Secondly, once a call is handled by a PSAP the use of VoIP telephone has further complicated the ability to detect the location of a caller when an emergency call is placed.

For example, when a caller uses a VoIP telephone, the call is generally placed though the internet or other such packet switched network. Thus, when a dial string such as 9-1-1 is placed, the devices/routers handling the call do not have the capacity to properly determine the location of the caller to route the calls to a local PSAP through the internet. Although PSAP's may be able to handle incoming VoIP internet calls, the outgoing VoIP routers would not know which local PSAP to send them to, since the location of the VoIP caller is unknown.

Furthermore, in standard landline telephone calls made to 9-1-1 or other similar emergency telephone numbers, the 9-1-1 call center is able to trace the physical location of the caller through a standard call trace since the location of the line is fixed. This is particularly useful when a caller is not able to give their location either because they do not know their location or they are physically unable to verbalize their location. Also, with cellular callers, GPS (Global Positioning System), other location systems, or cell tower triangulation can be used to physically locate an emergency caller.

However, with VoIP telephones the call is connected to the destination telephone via the internet. This makes it difficult and/or impossible to easily trace the physical location of caller if they are unable to give the location on their own. This presents an added difficulty in directing emergency personal in the case of a 9-1-1 or other emergency call that is placed from a VoIP phone.

OBJECTS AND SUMMARY

The present invention looks to overcome the drawbacks associated with the prior art and to provide a system and method for emergency call centers to obtain the location of a VoIP caller in the case of an emergency call.

To this end, the present invention provides for a method for determining the location of a VoIP caller including receiving a call from a VoIP phone, where the VoIP phone accesses the internet via a VoIP enabling device. A device identifier of the VoIP enabling device through which the call from the VoIP device originated is received. The device identifier is compared against a pre-defined table of device identifiers, where each device identifier in the table has an associated physical location. The physical location of the VoIP enabling device is returned during the call from the VoIP phone.

BRIEF DESCRIPTION OF THE DRAWINGS

The present invention can be best understood through the following description and accompanying drawings, wherein:

FIG. 6 illustrates a MAC address table, in accordance with one embodiment of the present invention;

DETAILED DESCRIPTION

In one embodiment of the present invention, a first arrangement is shown illustrating a typical VoIP installation for a commercial office setting. Here, a plurality of VoIP telephones 10a-10x are preferably connected to a PBX (Private Branch Exchange) device 12 that handles both VoIP calls as well as landline calls, and routes each call as necessary.

Figure 1:
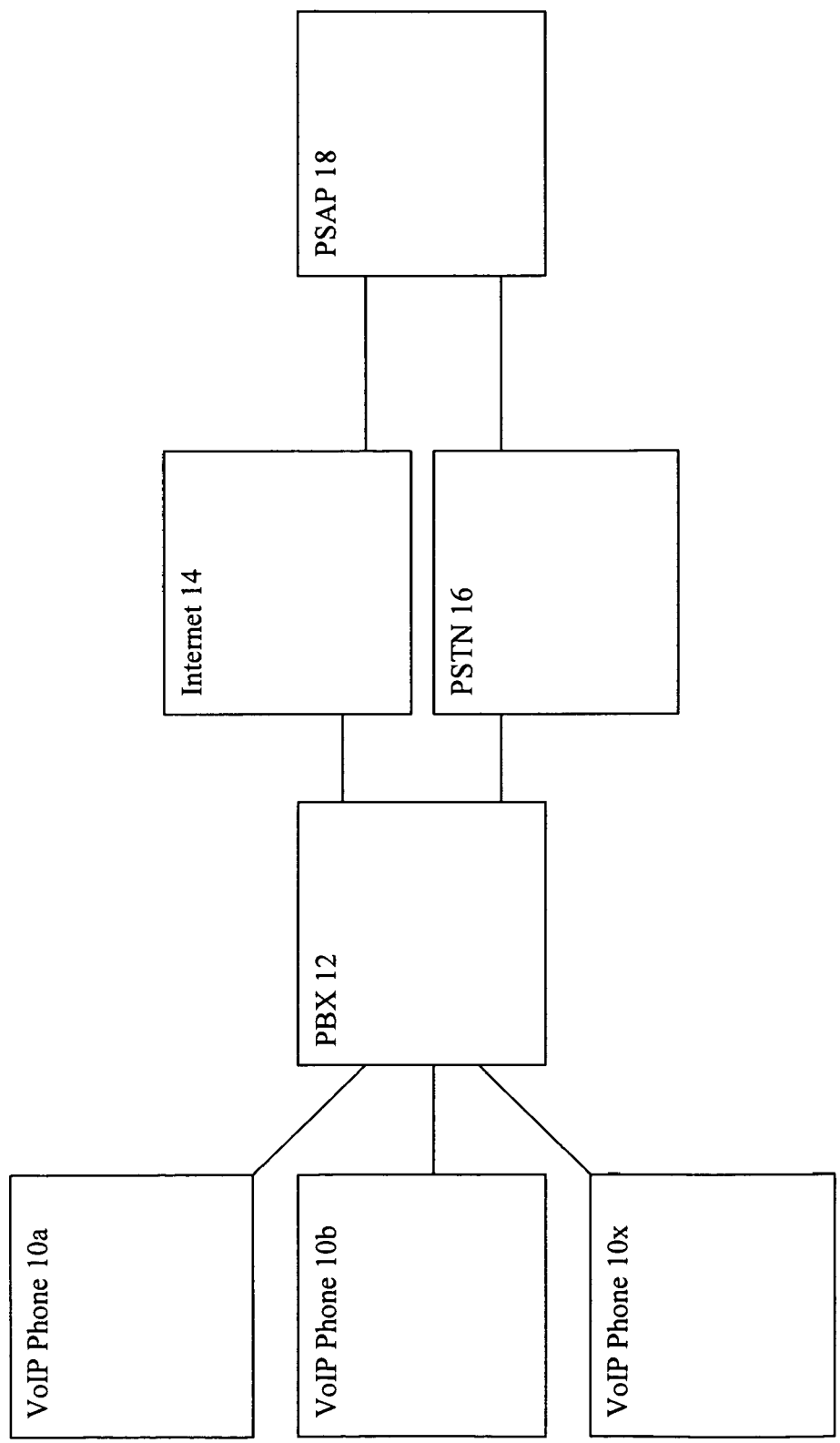
FIG. 1 illustrates an arrangement for a VoIP emergency system, in accordance with one embodiment of the present invention.

For VoIP calls originating from VoIP phones 10, PBX 12 typically routes the call through the internet, shown as element 14. For calls from other phones (not shown) connected to PBX 12, such as landline phones in the office building, these call are routed outbound over the PSTN (Public Switched Telephone Network), shown as element 16. As illustrated in FIG. 1, a local PSAP (Public Safety Access Point) 18, such as a 9-1-1 answering service, local police or local fire company is capable of receiving incoming communications from either the PSTN 16 or the internet 14.

Figure 2:
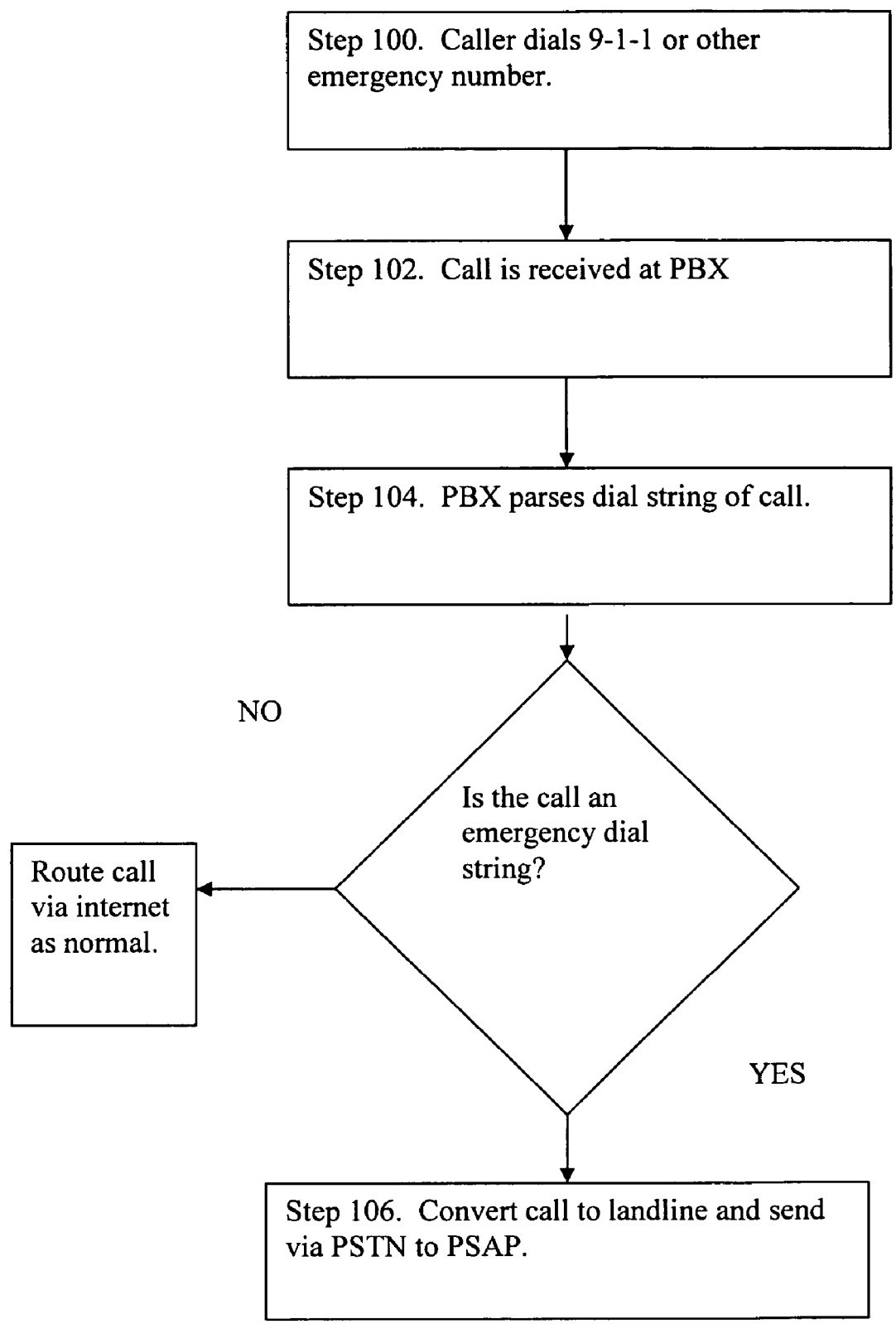
FIG. 2 is a flow chart for a PSAP telephone call placed through the VoIP system of FIG. 1, in accordance with one embodiment of the present invention.

As illustrated in flow chart FIG. 2, at a first step 100, a caller located at one of VoIP telephones 10 experiences an emergency and dials 9-1-1 or some other emergency access number. At step 102, the call is forwarded to PBX 12 for routing to the intended destination.

According to the arrangement of the present invention, at step 104, PBX 14, instead of automatically sending call 9-1-1 call by the internet 14 to PSAP 18, parses the communication to determine if it includes a dial string related to an emergency service. If not, the call is routed over Internet 14, as per normal call flow. In the present example, because the caller dialed 9-1-1, PBX 12 recognizes an emergency request dial string.

Thus, at step 106, instead of routing the call via the internet 14 to PSAP 18, PBX 12 converts the call to a landline call internally, and routes the call to PSAP 18 using the PSTN 16. This is done even though PSAP 18 could have received the call by the internet 14. Even though PSAP 18 would have gotten the call, by converting and re-routing the call through PSTN 16, PSAP 18 is able to take additional advantage of traditional call tracing to identify the location of the caller (ie. location of PBX 12). Thus, by the present invention a call originating from a VoIP phone 10 directed to a PSAP 18 allows them to locate the location of the caller.

In another embodiment of the present invention, an arrangement for reaching a PSAP using a CDMA/VoIP smart phone is described, where the PSAP can determine the location of the caller. Here CDMA/VoIP smart phone 110 operates as a typical smart phone. When WiFi is available to smart phone 110, it attempts to complete the call as VoIP to save airtime. Alternatively, if no WiFi is available, smart phone 110 simply handles the call by CDMA technology.

Figure 3:
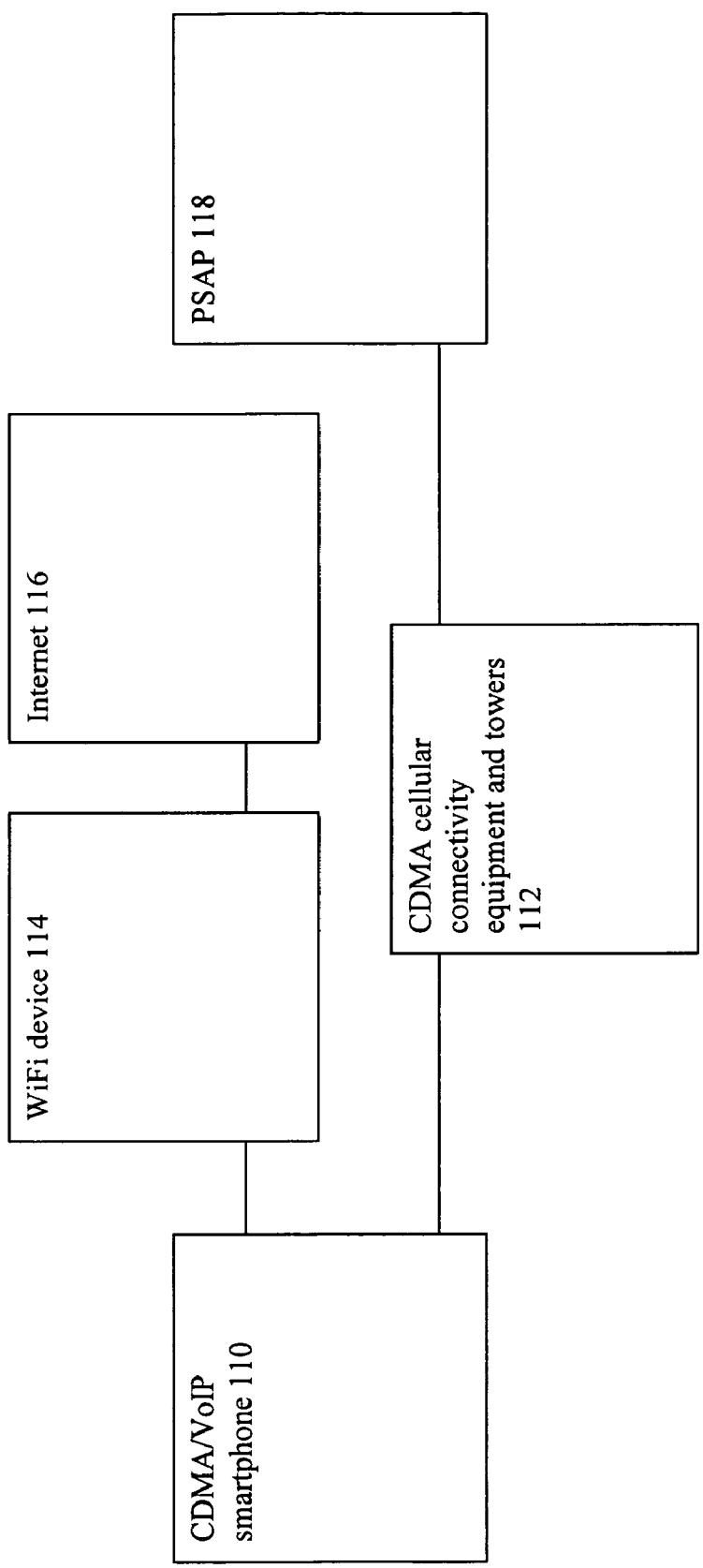
FIG. 3 illustrates an arrangement for a VoIP emergency system, in accordance with another embodiment of the present invention.

Thus, a typical connectivity arrangement, as shown in FIG. 3, shows smart phone 110 having connections with either one of or both traditional CDMA cell towers 112 and a WiFi enabling device 114. WiFi enabling device 114 is typically a wireless router however, any wireless capable internet access points, capable of receiving WiFi communications from smart phone 110 and communicating them through the internet, are within the contemplation of the present invention.

CDMA cell towers 112 connect smart phone 110 to the desired party via traditional cellular transmission methods. WiFi device 114 is coupled to the internet, pictured as 116, to complete the call by VoIP methodology. A PSAP 118 is coupled to both internet 116 and the CDMA cell tower 112 telephony connection equipment (including the combined mobile networks and PSTN and any other components of tradition cellular telephony connectivity).

Figure 4:
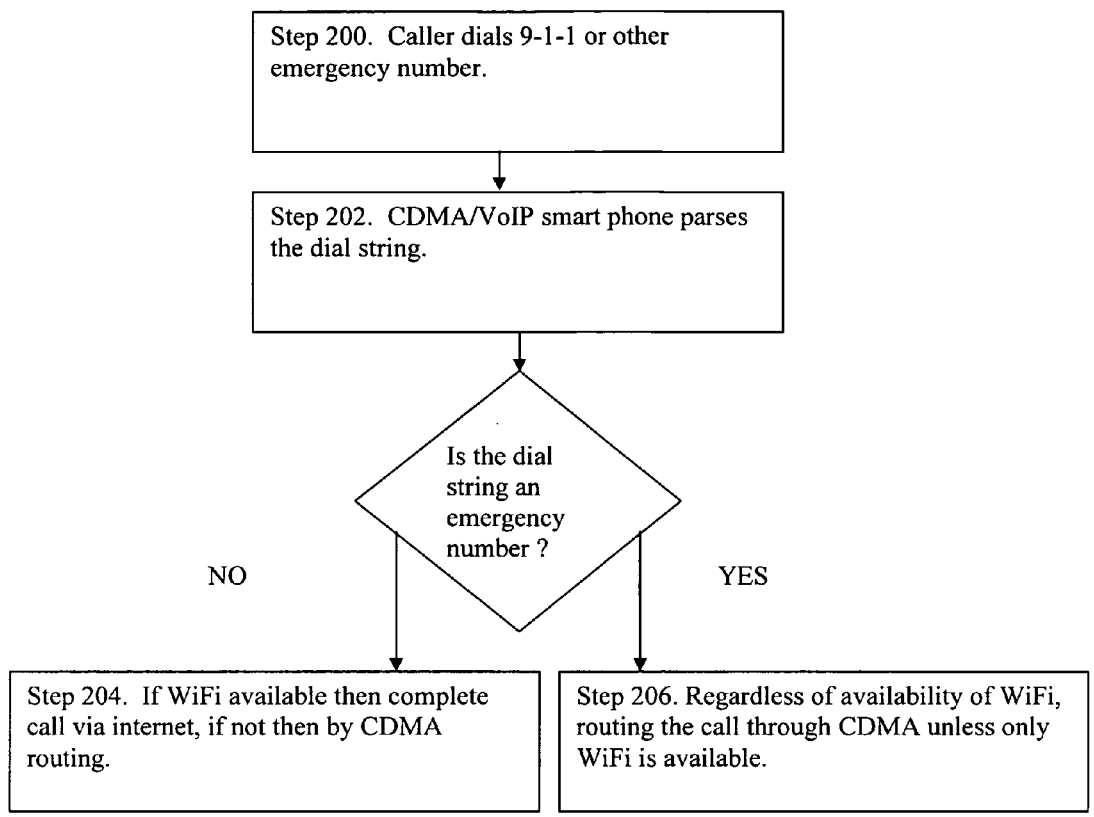
FIG. 4 is a flow chart for a PSAP telephone call placed through the VoIP system of FIG. 3, in accordance with one embodiment of the present invention.

According to the present invention, as illustrated in flow chart FIG. 4, at a first step 200, a caller using CDMA/VoIP smart phone 110 experiences an emergency and dials 9-1-1 or some other emergency access number. At step 202, smart phone immediately parses the dial string to determine if it is an emergency string or if it is just a standard telephone call. If it is a standard call, then at step 204 the call is simply routed via WiFi device 114 if available, or, if not available, then over cell tower network 112.

However, in the present example where the dial string is an emergency call, smart phone 110, at step 206 regardless of the availability of WiFi device 114, smart phone 110 routes the call through CDMA routing via cell towers 112. This is done even though PSAP 118 could have received the call by the internet 116. Even though PSAP 118 would have gotten the call, by choosing and routing the call through cell towers 112, PSAP 118 in addition to simply receiving the call, is able to take additional advantage of available caller location technology such a tower triangulation, GPS or other location technologies available from the mobile service provider to identify the location of the caller. Thus, by the present invention, a call originating from CDMA/VoIP smart phone 110 directed to a PSAP 118 allows PSAP 118 to locate the location of the caller.

Obviously, if the dial string were recognized as an emergency call, and only WiFi device 114 were available, the call would still be completed to PSAP 118, even if no location were available. If available the physical location of WiFi device 114 may be known if otherwise registered with PSAP 118 as described in more detail below.

Figure 5:
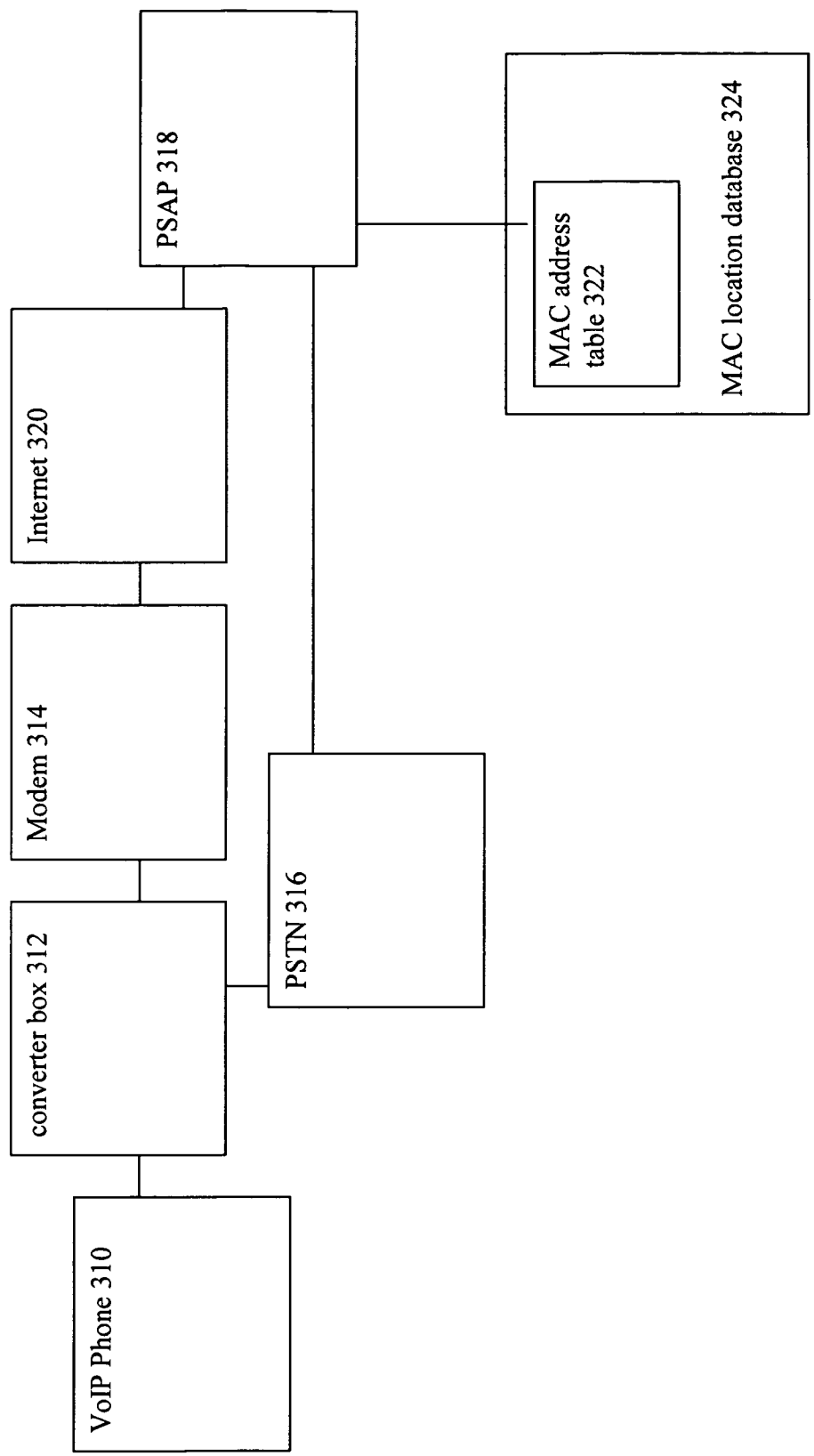
FIG. 5 illustrates an arrangement for a VoIP emergency system, in accordance with another embodiment of the present invention.

In another embodiment of the present invention, as illustrated in FIG. 5, another typical caller may employ a VoIP only phone 310 that is connected to the outside world via a physical Ethernet-to-SIP converter box 312 physically plugged into their DSL or Cable Modem 314 at home. This arrangement of VoIP telephony connectivity make up a substantial portion of the PSTN (Public Switched Telephone Network) enabled VoIP connections. Here, soft phone 310 generates a telephony communication which can either be sent by PSTN 316 or via the internet 320 depending on how converter box 312 is arranged.

According to the present invention when converter box 312 is operating to convert the calls to PSTN landline calls, then when 9-1-1 or other emergency calls are placed via VoIP only phone 310, the calls are routed to a local PSAP 318 via PSTN 316.

However, when box 312 is set to deliver communications via modem 314 and subsequently internet 320, then PSAP 318 may determine the location by way of tracing the MAC (Media Access Control) address of the devices used in the communication by consulting a MAC address table 322 stored in Physical location MAC address database 324.

The physical SIP/PSTN converter 312 connected to the network (PBX or other home modem our router 314) has a unique MAC address that can be used to provide the physical path—from the converter 312, to the router and then onto the DSL or Cable Modem 314, to the network and out over internet 320. Each of these devices has a MAC (Media Access Control) address, a fixed and unique identifier that can be used for PSAPs 318 services to assist in obtaining the location of the caller. Thus, in one embodiment of the present invention, by using the MAC address of the nodes 312 and 314 in the network, the physical location of the VoIP phone path through the various VoIP call routers is sufficient to give a physical location of a VoIP phone 310 to PSAP 318.

For example, according to the present invention PSAP 318 can determine the location of an emergency caller using a VoIP telephone 310 by utilizing the MAC (Media Access Control) address of the physical SIP/PSTN converter 312. Because the physical location of the device 312 making the converted landline call is known to PSAP 318 as discussed below, a local call trace to the device can be used, not available on traditional VoIP telephone calls.

In order to facilitate this, a MAC address table 322 is stored in physical location MAC address database 324. As illustrated in FIG. 6, MAC address table maintains a first MAC number field 326 and a second physical location field 328 with an entry associated with each the MAC number field 326 entry in table 322.

MAC address table 322 can be generated either by a simple software set-up operation, where devices 312, 314 etc. . . involved with VoIP communications can register with service that maintains table 322. This process can be voluntary at set-up, voluntary at a later time frame (ie. by request) or even carried out by a local PSAP 318. For example, a process of e-mail invitations may be used by PSAP 318 or the third party organizer of table 322 to request registration of WiFi device 314. It is understood that the present invention contemplates that the service for setting up MAC address table 322 and location database 324 on which it resides is handled either by PSAP 318 itself, by PSAP 318 with third party software support or entirely off-site by a third party operator.

As illustrated in FIG. 5, MAC address table and MAC location database 324 are pictured outside of PSAP 318. However, this is in no way intended to limit the scope of the present invention. MAC location database 324 and table 322 may be maintained either within the physical location of PSAP 318 or instead by a third party operator physically located remotely from PSAP 318.

It is also noted that PSTN 316 replacement VoIP providers can detect when the MAC address path changes. When the SIP Phone 310 or converter VOX 312 registers itself onto the network, at that point, a call to the user of VoIP phone 310 and converter 312 can be placed requesting an updated address. Such a registration process takes seconds, and would solve any location quandaries for PSAP 318.

Figure 7:
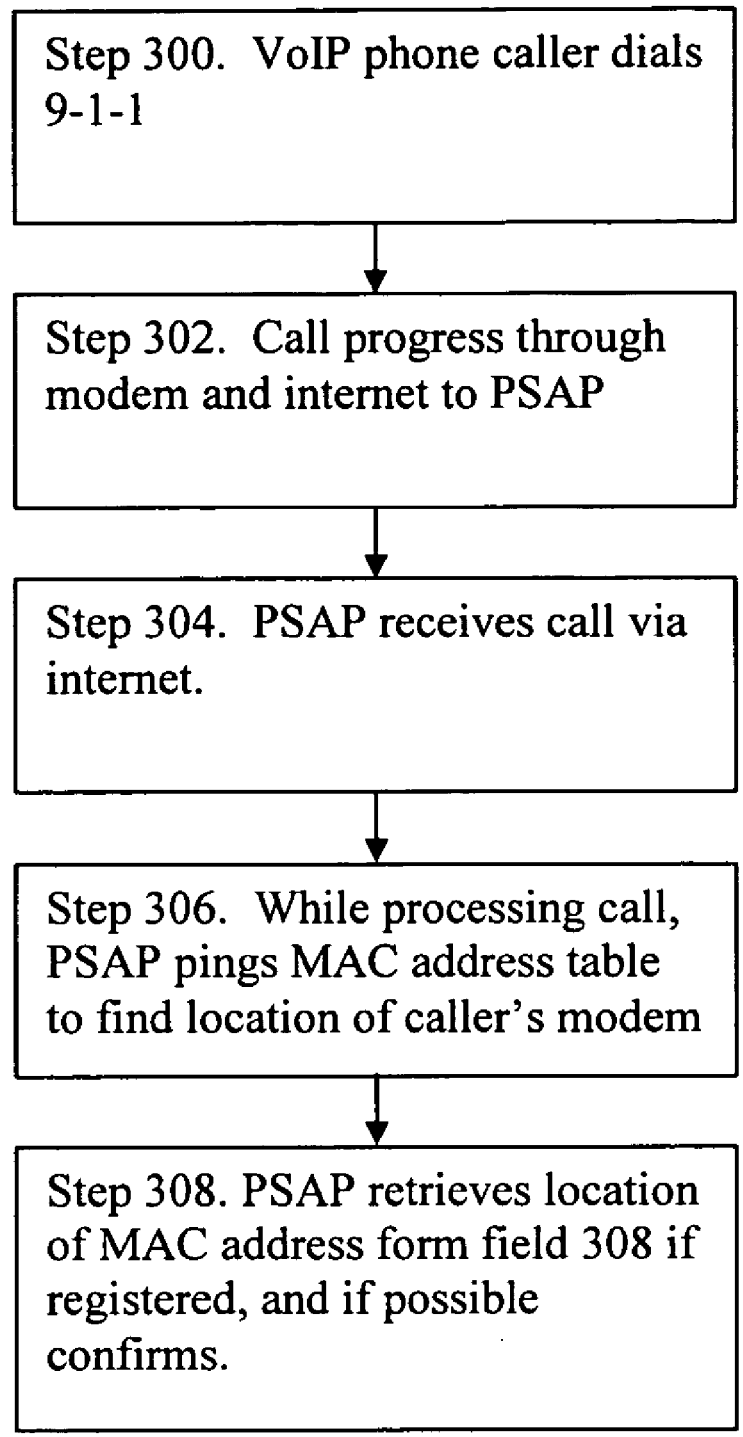
FIG. 7 is a flow chart for a PSAP telephone call placed through the VoIP system of FIG. 5, in accordance with one embodiment of the present invention.

In one embodiment of the present invention as illustrated in flow chart FIG. 7, an exemplary call flow from VoIP phone 310 to PSAP 318 over internet 320 is shown. At a first step 300, a caller dial 9-1-1 or another emergency number using VoIP phone 310. At step 302, converter 312 and modem 314 send the call out over internet 320. Next, at step 304, the call is routed to PSAP 318 which receives the call via their incoming VoIP call equipment.

According to the present invention, at step 306, while handling the call from VoIP phone 310, PSAP 318 pings MAC address table 322 at MAC database 324 to see if the MAC address of the incoming call is listed. If not, then the call with PSAP 318 proceeds as normal, but it is conducted without the benefit of any auto-location of the caller. However, if the MAC address of the network equipment 312 or 314 of the incoming call is found in table 322, then the physical location of the equipment, such as box 312 or modem 314, is sent to the operator at PSAP 318. At step 308, as confirmation, the operator at PSAP 318 may ask to confirm the location if the caller is lucid and aware of their location. It is noted that in the case where a VoIP emergency call comes in and no associated MAC address is found in table 322 then a record is made of the incoming MAC address and an invitation is sent to the owner or manager requesting that the register device 314 in table 322 for future calls.

Figure 8:
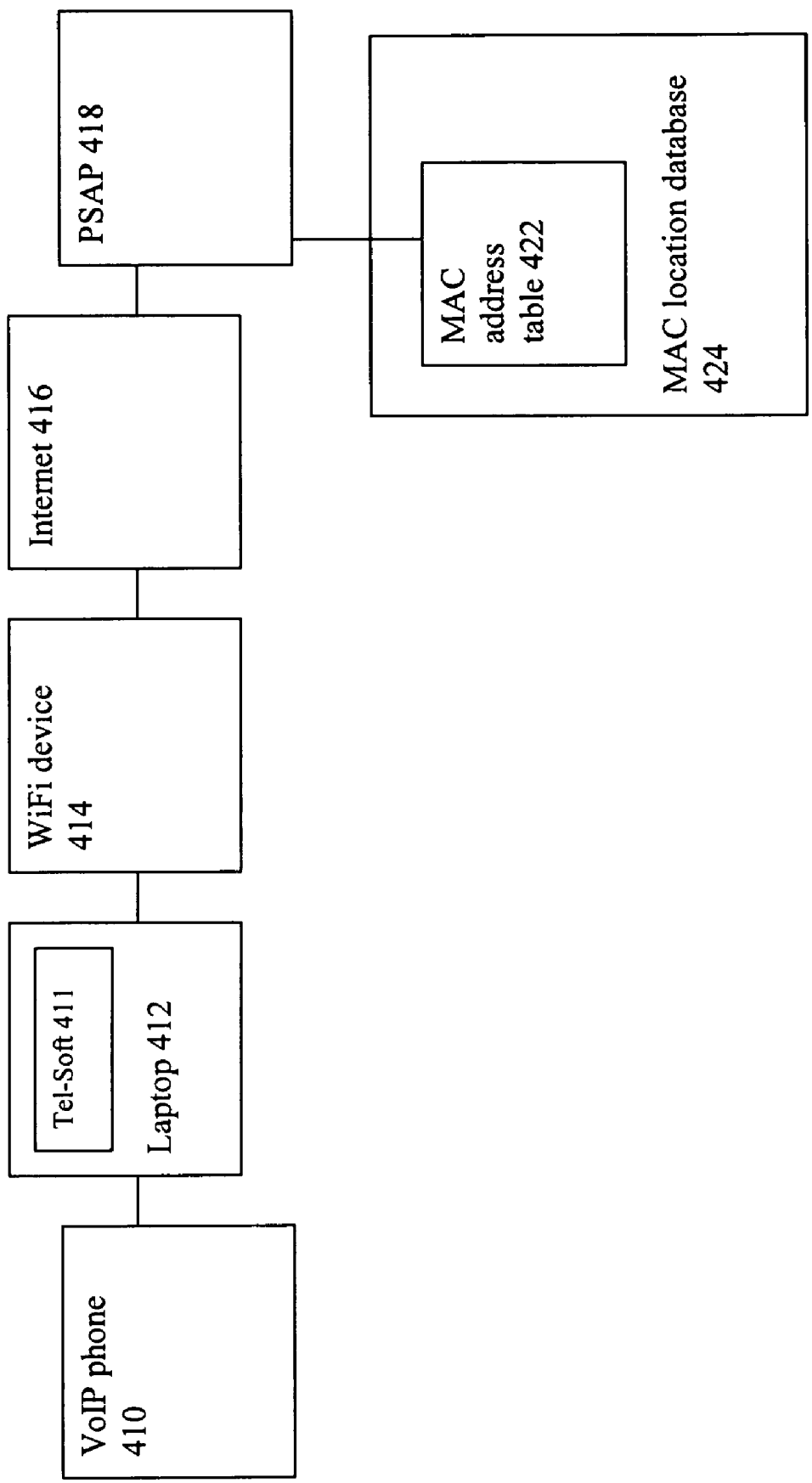
FIG. 8 illustrates an arrangement for a VoIP emergency system, in accordance with another embodiment of the present invention.

In another embodiment of the present invention, as illustrated in FIG. 8, another arrangement shows PSAP 418 connectivity for users who run all of their phone conversations through softphones 410 or other VoIP devices 411 or via their laptops 412. Here, unlike either the softphones via PBX or smart phone with CDMA, the calls from these VoIP phones 410 are handled exclusively through the internet. Similar to the previous arrangement from FIG. 5, laptops 412 are presumably in wireless contact with WiFi enabling device 414, which are connected to the internet 416, and which in turn are connected to PSAP 418.

According to this embodiment of the present invention, a MAC address table 422 is generated and stored in Physical location MAC address database 424. Similar to the MAC address table 322 from FIG. 6, MAC address table 422 maintains a first MAC number field 426 and a second physical location field 428 associated with the MAC number field 426 for each MAC address entry in table 422. Likewise, the call flow from FIG. 7 is repeated in the case of emergency calls from VoIP phone 410 or laptop 412.

Regardless of the registration process for the physical locations of the WiFi routing devices 314 or 414 it is known that WiFi networks have very limited radii—typically only as large as a house, office, coffee shop, or airport lounge. When the VoIP Phone 310 or 410 registers itself on he network, the WiFi based station's MAC address can be identified and the physical location of the caller be identified. Since WiFi networks don't really "roam", there is not need to track locations using a triangulation system. The registration process also enables WiFi routers 314 and 414 to identify the correct local PSAP 318 or 418 to ensure that any VoIP telephone call that is sent therethrough is routed to a PSAP 318 or 418 that is both local and capable of handling incoming VoIP calls.

Figure 9:
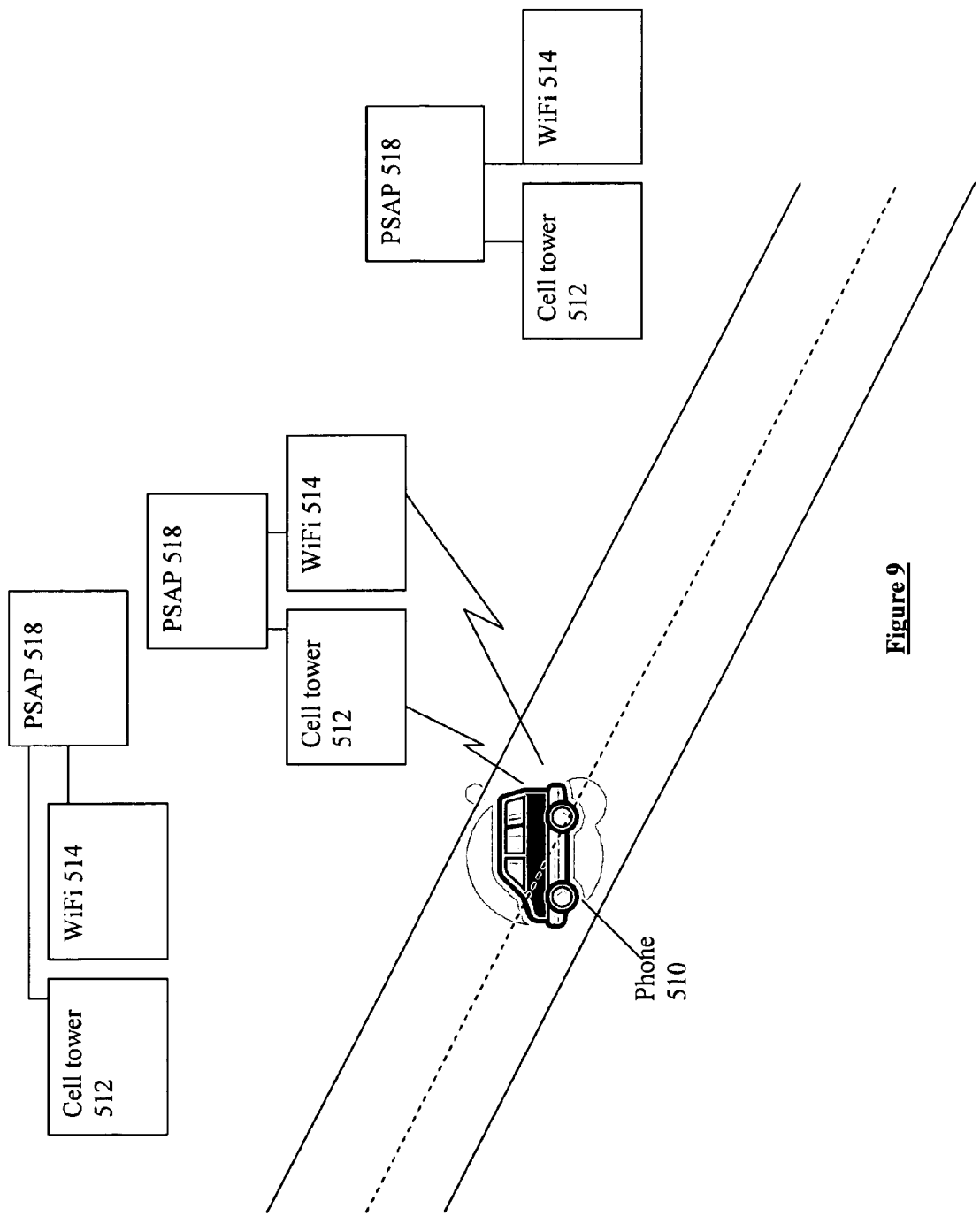
FIG. 9 illustrates an arrangement for a VoIP emergency system, in accordance with another embodiment of the present invention.

In another embodiment of the present invention, as illustrated in FIG. 9, road users of a softphone 510 may benefit from the present invention. Here VoIP phones 510 move along a road from one cell tower 512 to the next and through WiFi hotspot 514 to the next. Each of cell towers (and associated telephony connectivity equipment) 512 and WiFi devices 514 are connected to local PSAPs 318.

In the case of the road user using a CDMA (GSM 3G)/VoIP phone then the call arrangement would operate similarly to FIGS. 3 and 4 described above.

In the case of cellular towers 512 not being available or if phone 510 is VoIP only then the operation would occur similarly to FIG. 5 through 7 above.

In another embodiment of the present invention, it is contemplated that the location of VoIP phone 510 may be determined based on relative signal strength when more than one tower 512 or WiFi device 514 is within range of phone 510. Although this may be more common in the case of a traveling VoIP phone 510 as shown in FIG. 9, it is contemplated that such an arrangement is equally applicable in any of the above described arrangements.

Figure 10:
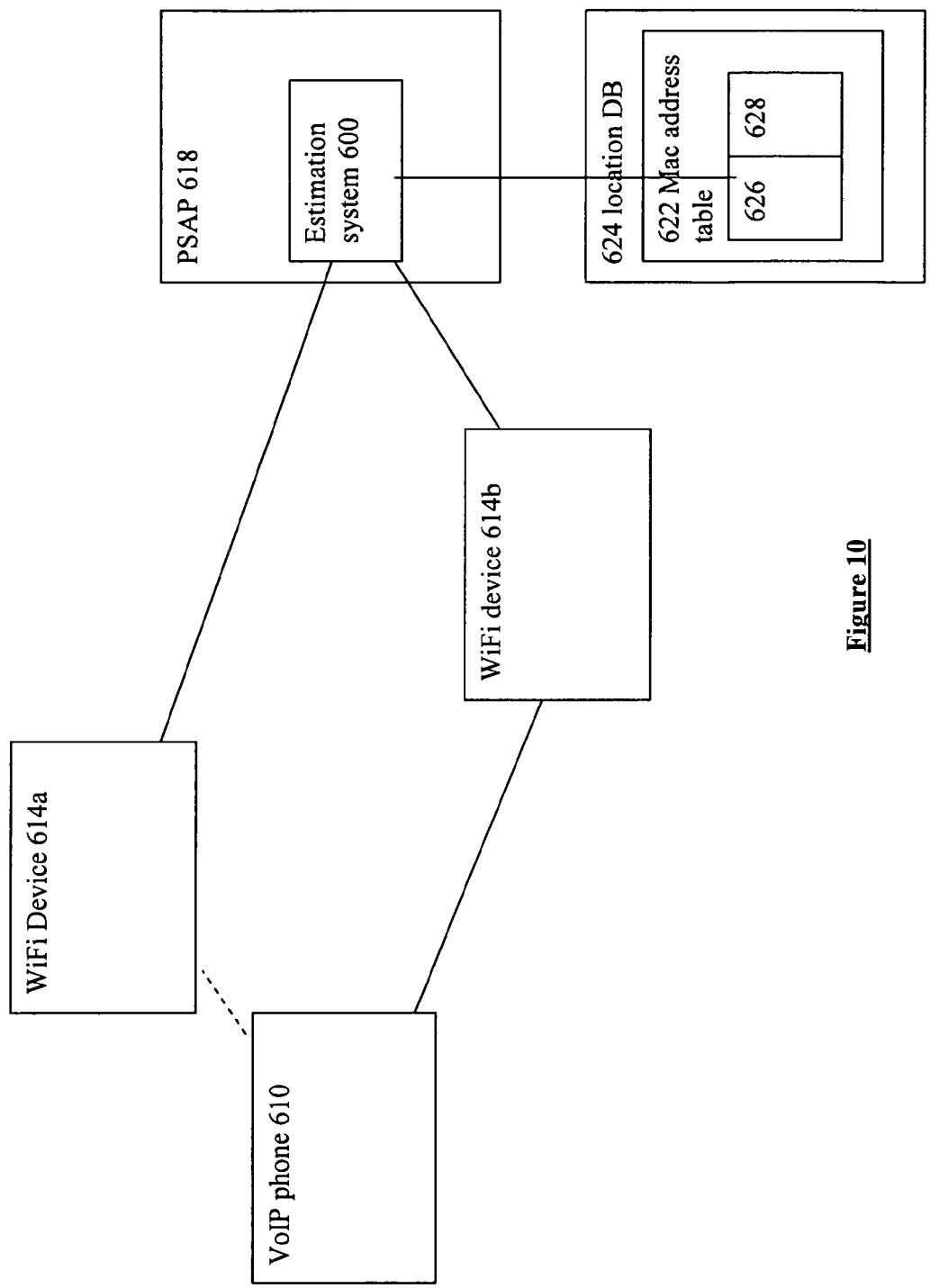
FIG. 10 illustrates an arrangement for VoIP emergency system with multiple access points for the VoIP phone, in accordance with one embodiment of the present invention.

For example, as illustrated in FIG. 10, a range estimation and location system 600, may be used to determine the location of VoIP phone 610 by employing the VoIP device's 610 internal signal strength list.

In general VoIP communication devices 610 perform a scan of nearby access points and their corresponding MACs before establishing a connection to a desired access point and initiating a call. However, a user may choose an access point that is farther away than the closest access point for reasons besides simple signal strength. For example, a more remote, but adequate access point may be free. However, when responding to an emergency call, ideally the PSAP should respond in the direction of the closest access point to the caller, regardless of whether or not they are using this access point, assuming both access points are registered.

In the present invention, a range estimation and location system 600 is employed by PSAP 618. As with the previous embodiments such a system 600 may be employed externally or even by a third party operator.

Thus, in situation where VoIP phone 610 is located between a first closer WiFi device 614*a* and a second farther WiFi device 614*b*, VoIP phone 610 maintains the signal strengths of both, but chooses a connection to the later, WiFi device 614*b*. It is understood that both WiFi devices have significantly limited geographic coverage relative to the geographic area covered by PSAP 618 and thus, both WiFi devices 614*a* and 614*b* are registered to the same PSAP.

Figure 11:
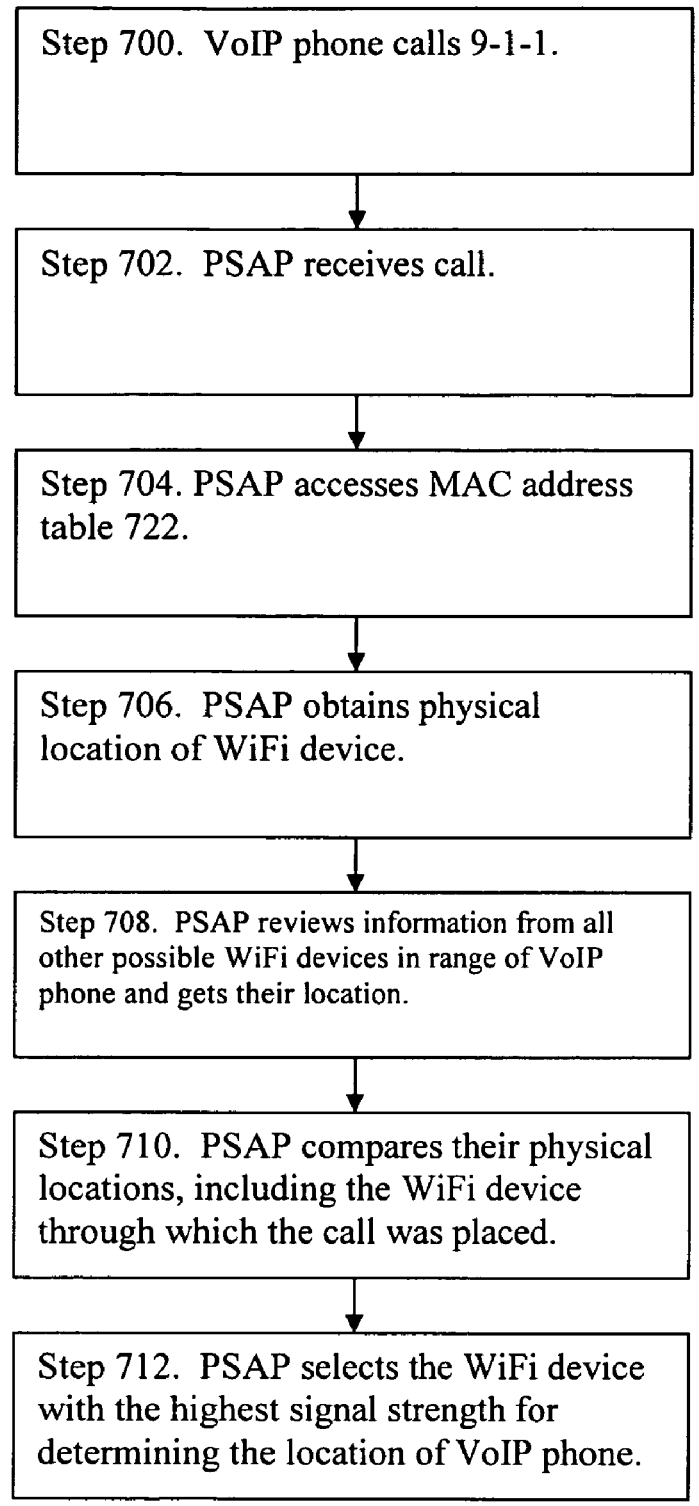
FIG. 11 is a flow chart for a PSAP telephone call placed through the VoIP system of FIG. 10, in accordance with one embodiment of the present invention.

In one embodiment of the present invention, as illustrated in flow chart FIG. 11, at step 700, a caller dials 9-1-1 or some other VoIP phone 610. At step 702 the call is sent to the local PSAP 618, via connectivity through WiFi device 614*b*.

Simultaneously, the signal strengths of all available WiFi devices 614 are sent to, or otherwise electronically requested/retrieved by, PSAP 618.

At step 704, PSAP 618 consults a MAC address table 622 in MAC database 624, similar to the ones shown above in FIG. 6. At step 706, the MAC address of the incoming call is compared against MAC field 626 and location of WiFi device 314b is determined from field 628.

According to the present embodiment, at step 708, in addition to checking the location of WiFi device 314b, system 600 further imports or retrieves all of the WiFi data (signal strengths) on available WiFi devices 614 for VoIP phone 610, such as WiFi device 614a and also consults MAC address table 622 for their locations as well.

At step 710, system 600 compares the signal strength of WiFi device 614b, upon which the VoIP call was placed, to the signal strength of WiFi device 614a, which is closer to VoIP phone 610, but not being used for the call. At step 712, PSAP selects WiFi device 614a for determining the location of VoIP phone 610, because it assumes that VoIP phone 610 is in closer proximity to WiFi device 614a than WiFi device 614b, even though the call connection is through device 614b, because the signal strength from VoIP phone 610 to device 614a is higher.

Obviously, the present system could be expanded to accommodate as many WiFi devices that are in the range of VoIP phone 610 and registered to MAC address table 622. Also, if for any reason the higher signal strength WiFi device 614a is not registered to MAC address table 622, system 600 of PSAP 618 may still use the lower signal strength WiFi device 614b, through which the call was placed to trace the call as per the examples above in FIGS. 7 and 8.

In accordance with another embodiment of the present invention, using the imported signal strengths to VoIP phone 610 from WiFi device 614 as discussed above may be further used to estimate distance from the closest location similar to a triangulation operation.

Figure 12:
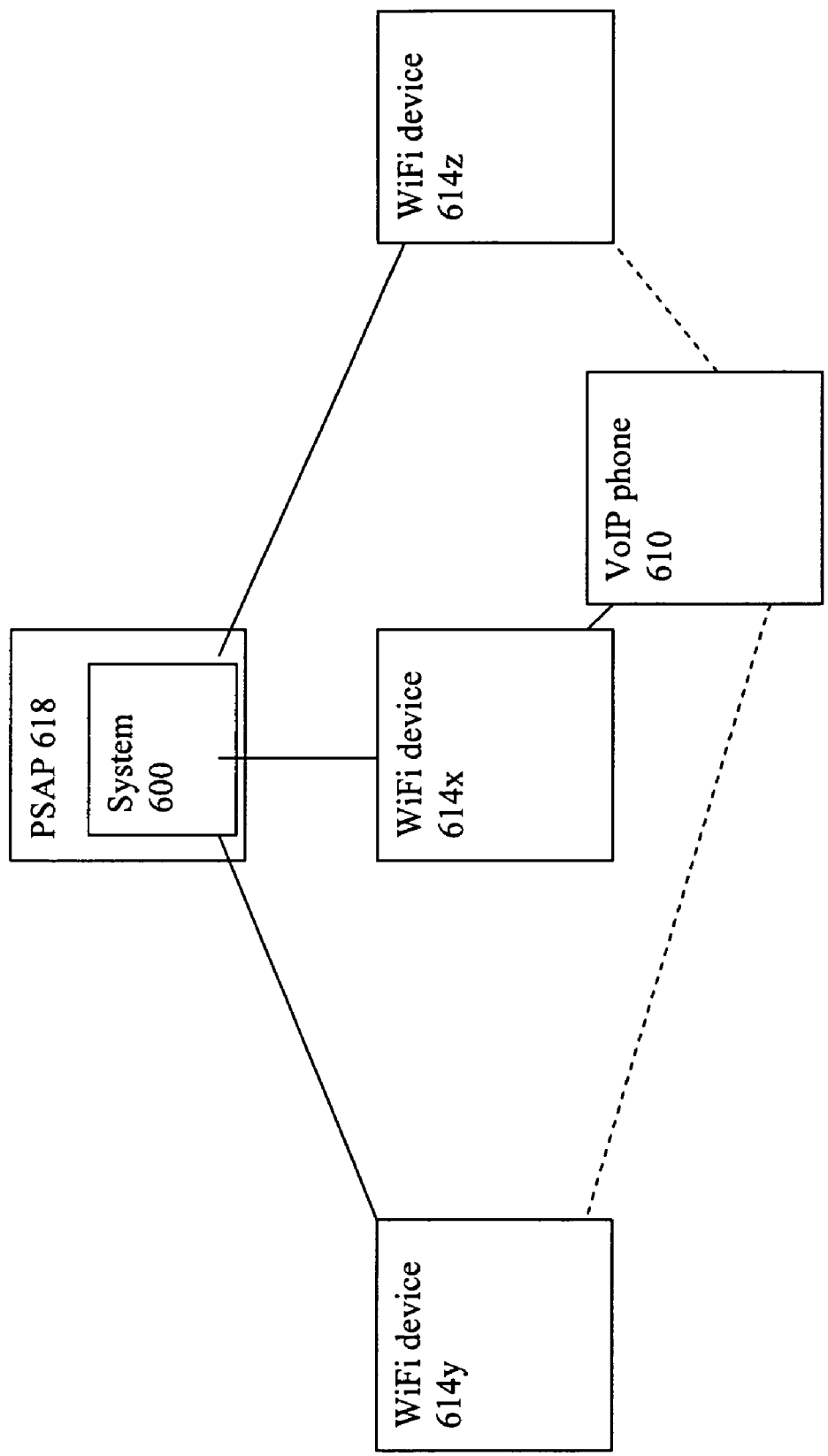
FIG. 12 illustrates an arrangement for VoIP emergency system with multiple access points for the VoIP phone, in accordance with another embodiment of the present invention.

For example, as illustrated in FIG. 12, an 9-1-1 emergency call from VoIP phone 610 to PSAP 618 from WiFi device 614x is shown, where WiFi devices 614x, 614y and 614z are all possible available networks. System 600 when importing the WiFi signal strengths notes that device 614x has a strength of 100%, 614y has a strength of 20% and 614z has a strength 60%. Thus, in addition to system 600 choosing WiFi device 614x to base the location determination on, system 600 will further know that VoIP phone 610 is closer device 614z than device 614y and may further employ this information to assist in locating the caller.

It is understood that while the above described exemplary embodiments of the invention are described in terms of emergency situations, the present invention using a MAC address table for locating callers by WiFi access point locations may also be used in non-emergency situations as well.

For example, a link on a user's softphone or other VoIP unit, such as "Locate Me" link may be provided. By activating the link a provider employing the system of the present invention may locate the caller using the MAC or IP address of the access point network device as discussed above.

Such an arrangement allows a faster real-time knowledge of the location of the VoIP caller so that the MAC address look up does not need to be carried out after a 9-1-1 call. Also, if authorized, it may allow the system to let the real time location of the VoIP operator to be provided to other members of friends list.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method for determining the location of a VoIP caller, said method comprising the step of:
  receiving an emergency call from a VoIP phone, said VoIP phone accessing the internet via one of a plurality of VoIP enabling devices, where each of said plurality of VoIP enabling devices is within range of said VoIP phone;
  receiving device identifiers of said VoIP enabling devices, including both said VoIP enabling device through which said call from said VoIP device originated and at least one other VoIP enabling device which is not used for the call handling;
  receiving signal strength indications from said VoIP enabling devices through which said call from said VoIP device originated and said at least one other VoIP enabling device which is not used for the call handling;
  comparing said signal strengths of said VoIP enabling devices through which said call from said VoIP device originated and said at least one other VoIP enabling device which is not used for the call handling; and determining a location of said VoIP phone based on the VoIP enabling device that has the highest signal strength.

2. The method as claimed in claim 1, where said step of determining said location is performed by comparing a device identifier against a pre-defined table of device identifiers, each device identifier in said table having an associated physical location.

3. The method as claimed in claim 1 wherein said step of determining a location of said VoIP phone based on the VoIP enabling device that has the highest signal strength is done based on said VoIP enabling device that is not used for the call handling.

* * * * *